United States Patent [19]
Babin

[11] Patent Number: 6,030,198
[45] Date of Patent: Feb. 29, 2000

[54] INJECTION MOLDING APPARATUS HAVING MELT TRANSFER AND DIVIDING BUSHING

[75] Inventor: Denis L. Babin, Acton, Canada

[73] Assignee: Mold-Masters Limited, Georgetown, Canada

[21] Appl. No.: 08/977,675

[22] Filed: Nov. 24, 1997

[30] Foreign Application Priority Data

Oct. 23, 1997 [CA] Canada .................................... 2219197

[51] Int. Cl.⁷ .................................................. B29C 45/16
[52] U.S. Cl. .......................................... 425/130; 425/562
[58] Field of Search .................................. 425/130, 562, 425/563, 565, 566, 564

[56] References Cited

U.S. PATENT DOCUMENTS

| | | | |
|---|---|---|---|
| 4,712,990 | 12/1987 | Kudert et al. | 425/523 |
| 4,932,858 | 6/1990 | Gellert | 425/564 |
| 5,094,603 | 3/1992 | Gellert | 425/130 |
| 5,223,275 | 6/1993 | Gellert | 425/130 |
| 5,374,178 | 12/1994 | Nakayama | 425/130 |
| 5,795,600 | 8/1998 | Rozema | 425/562 |

*Primary Examiner*—Tim Heitbrink
*Attorney, Agent, or Firm*—Dalesman & Company

[57] ABSTRACT

Multi-layer injection molding apparatus having integral melt transfer and dividing bushings extending from a rear melt distribution manifold through openings in a front melt distribution manifold to aligned heated nozzles. Each bushing has two or three integral layers which are drilled and machined to have melt holes through them connected to melt conduits between them which divides one melt flowing from the rear melt distribution manifold to several bores extending to an annular melt channel in the aligned heated nozzle. In some embodiments, the bushing can also divide a second melt flowing from the front melt distribution manifold to another annular channel in the aligned heated nozzle.

18 Claims, 9 Drawing Sheets

INJECTION MOLDING APPARATUS HAVING MELT TRANSFER AND DIVIDING BUSHING

BACKGROUND OF THE INVENTION

This invention relates to multi-layer injection molding apparatus and more particularly to such apparatus having integral multi-layer melt transfer and dividing bushings extending from a rear melt distribution manifold through openings in a front melt distribution manifold to aligned heated nozzles.

Injection molding apparatus for making multi-layered protective containers for food or preforms or parisons for beverage bottles are well know. Often the inner and outer layers are made of a polyethylene terephthalate (PET) type material with one or more barrier layers made of a material such as ethylene vinyl alcohol copolymer (EVOH) or nylon. As seen in U.S. Pat. No. 5,094,603 to Gellert which issued Mar. 10, 1992, it is known to have a number of heated nozzles each having an annular melt channel extending around the central melt channel extending forwardly from a single melt distribution manifold. U.S. Pat. No. 5,094,603 also shows the melt flowing to the annular melt channel in the heated nozzle dividing in a single layer melt distribution plate mounted between the rear end of the heated nozzle and the front end of the melt distribution manifold.

However, when molding materials having different injection temperatures, it is preferable to distribute the two melts through front and rear melt distribution manifolds which are spaced apart. While apparatus having spaced melt distribution manifolds is shown in U.S. Pat. No. 5,223,275 to Gellert which issued Jun. 29, 1993, it has the disadvantage that only the spacer discs mounted between the front and rear melt distribution manifolds only have a single melt outlet.

SUMMARY OF THE INVENTION

Accordingly, it is an object of the present invention to at least partially overcome the disadvantages of the prior art by providing multi-layer injection molding apparatus having melt transfer and dividing bushings extending through the front melt distribution manifold from the rear melt distribution manifold to each heated nozzle which both transfer and divide the melt flowing through a number of melt bores in the rear end of the heated nozzle.

To this end, in one of its aspect, the invention provides a melt transfer and dividing bushing having a rear end and a front end for use in a multi-cavity hot runner injection molding apparatus having a plurality of heated nozzles mounted in a mold. Each melt transfer and dividing bushing transfers melt through a first melt passage extending from a common inlet on its rear end and dividing therein to four outlets at its front end. The melt transfer and dividing bushing has a rear layer and a front layer integrally joined together. The rear layer has a rear face, a front face and a first melt passage which splits in the rear layer to extend from the common inlet on its rear face to two outlets spaced on its front face. The front layer has a rear face, a front face and four spaced holes extending therethrough from the rear face to the front face. The rear face of the front layer abuts against the front face of the rear layer. The front face of the rear layer and the rear face of the front layer have matching grooves which form a pair of melt conduits. Each of the melt conduits branching from one of the outlets on the front face of the rear layer to two of the four spaced holes extending through the front layer. The first melt passage extends from the common inlet through the rear layer, the two melt conduits and the four spaced holes through the front layer to the four outlets at the front end of the melt transfer and dividing bushing.

In another of its aspects the invention provides multi-cavity hot runner injection molding apparatus for multi-layer molding having a front melt distribution manifold and a rear melt distribution manifold mounted in a mold extending substantially parallel to each other with an insulative air space therebetween. It includes a number of heated nozzles, each having a rear end, a front end, a central melt channel extending therethrough from the rear end to the front end and an annular melt channel extending around the central melt channel to the front end with a plurality of spaced melt bores extending from the rear end of the heated nozzle to the annular melt channel. The heated nozzles are mounted in the mold with the rear end of each heated nozzle abutting against the front melt distribution manifold. A first melt passage from a first melt source branches in the rear melt distribution manifold and extends through the plurality of melt bores and the annular melt channel in each heated nozzle to a gate adjacent the front end of the heated nozzle leading to a cavity in the mold. A second melt passage from a second melt source branches in the front melt distribution manifold and extends through the central melt channel in each heated nozzle to the gate. A number of melt transfer and dividing bushings each have a rear end and a front end and are mounted in openings through the front melt distribution manifold. The front end of each of the melt transfer and dividing bushing abuts against the rear end of one of the heated nozzles. Each melt transfer and dividing bushings has a portion of the first melt passage extending therethrough from a common inlet and dividing therein to a plurality of spaced holes at the front end thereof. The common inlet is aligned with the first melt passage in the rear melt distribution manifold and each hole at the front end is aligned with one of the melt bores extending from the rear end of the heated nozzle to the annular melt channel.

In a further aspect, the invention provides a multi-cavity hot runner injection molding apparatus for multi-layer molding having a front melt distribution manifold and a rear melt distribution manifold mounted in a mold extending substantially parallel to each other with an insulative air space therebetween. It includes a number of heated nozzles, each having a rear end, a front end, a central melt channel extending therethrough from the rear end to the front end and an inner annular melt channel extending around the central melt channel to the front end. A melt bore extends from the rear end of the heated nozzle to the inner annular melt channel. Each heated nozzle is mounted in the mold with its rear end abutting against the front melt distribution manifold. Each heated nozzle also has an outer annular melt channel extending to the front end around the inner annular melt channel and four spaced melt bores extending from the outer annular melt channel to the rear end of the heated nozzle. A first melt passage from a first melt source branches in the rear melt distribution manifold and extends through the central melt channel and the four spaced melt bores and the outer annular melt channel in each heated nozzle to a gate adjacent the front end of the heated nozzle leading to a cavity in the mold. A second melt passage from a second melt source branches in the front melt distribution manifold and extends through the at least one melt bore and the inner annular channel in each heated nozzle to the gate.

A number of melt transfer and dividing bushings each having a rear end and a front end are mounted in an opening through the front melt distribution manifold, with their front end abutting against the rear end of one of the heated nozzles. Each melt transfer and dividing bushings has a portion of the first melt passage extending therethrough from a common inlet and dividing therein to a central hole and four spaced holes at its front end. The common inlet is in alignment with the first melt passage in the rear melt distribution manifold. The central hole is in alignment with the central melt channel and the four spaced holes are in alignment with the four melt bores extending from the rear end of the heated nozzle to the outer annular melt channel.

Further objects and advantages of the invention will appear from the following description taken together with the accompanying drawings.

DETAILED DESCRIPTION OF THE INVENTION

Figure 1:
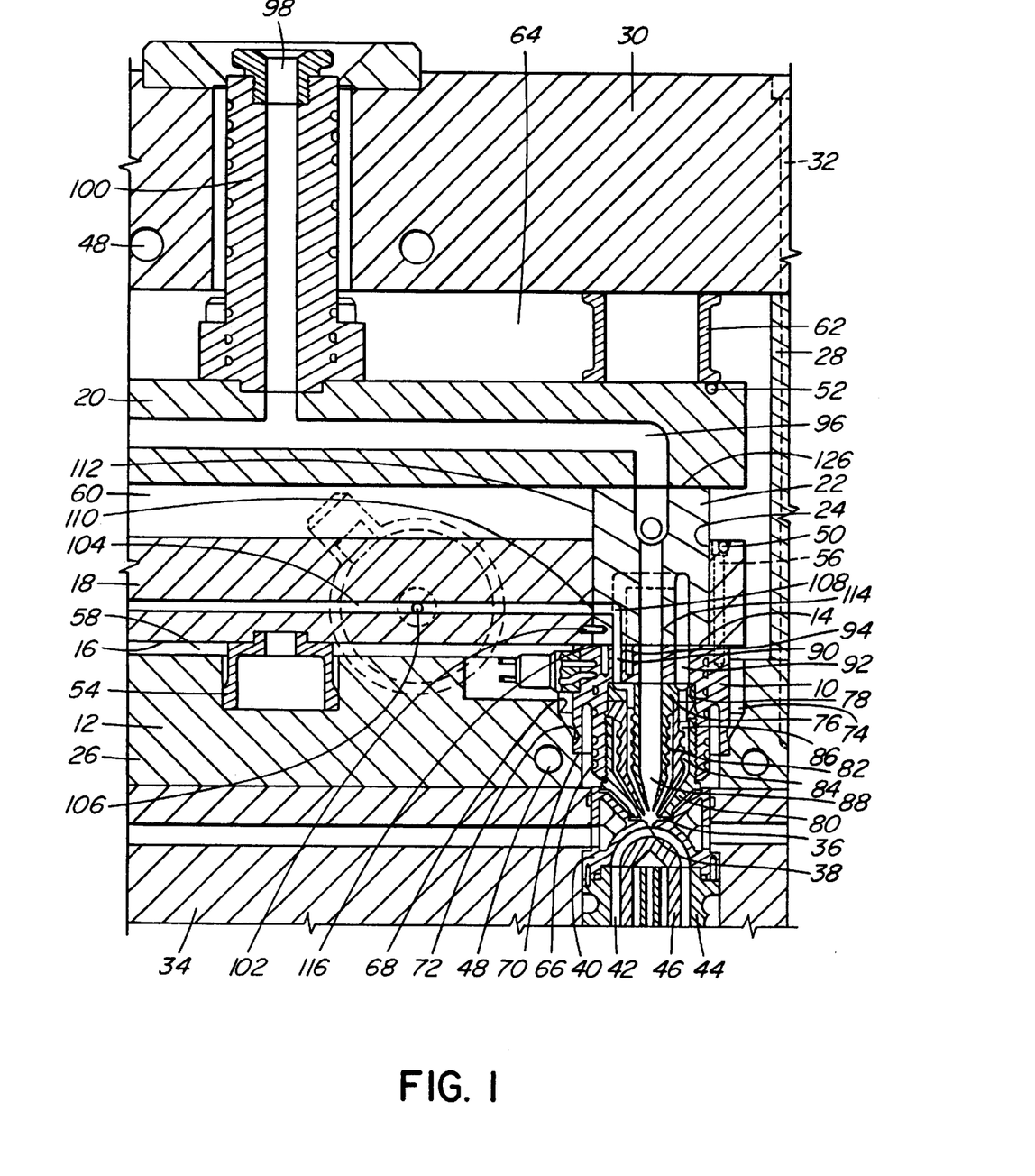
FIG. 1 is a sectional view of a portion of a multi-layer injection molding apparatus having integral two layer melt dividing bushings according to one embodiment of the invention.

Reference is first made to FIG. 1 which shows a portion of a multi-cavity injection molding apparatus for coinjecting three layer preforms or other products. A number of heated nozzles 10 are mounted in a mold 12 with their rear ends 14 abutting against the front face 16 of a steel front melt distribution manifold 18. The front melt distribution manifold 18 is spaced from a steel rear melt distribution manifold 20 by melt transfer and dividing bushings 22 which extend through an opening 24 in the front melt distribution manifold 18 in alignment with each heated nozzle 10. While the mold 12 can have a greater number of plates depending upon the application, in this case only a nozzle retainer plate 26, a spacer plate 28, and a back plate 30 secured together by bolts 32, as well as a cavity retainer plate 34 are shown for ease of illustration. The front end 36 of each heated nozzle 10 is aligned with a gate 38 extending through a cooled gate insert 40 to a cavity 42. This cavity 42 for making beverage bottle preforms extends between a cavity insert 44 and a mold core 46 in a conventional manner.

The mold 12 is cooled by pumping cooling water through cooling conduits 48 and each of the front and rear melt distribution manifolds 18, 20 are heated by integral electrical heating elements 50, 52. The front distribution manifold 18 is located by a central locating ring 54 and screws 56 extending into each heated nozzle 10 to provide an insulative air space 58 between it and the surrounding cooled mold 12. The rear melt distribution manifold 20 is spaced from the front melt distribution manifold 18 by the melt transfer and dividing bushings 22 which provides an insulative air space 60 between them. Similarly, spacer rings 62 provide an insulative air space 64 between the rear melt distribution manifold 20 and the back plate 30. Each heated nozzle 10 is heated by an integral electrical heating element 66. Each heated nozzle 10 is seated in an opening 68 in the nozzle retainer plate 26 by a collar portion 70 received in a circular seat 72 extending around the opening 68. This provides another insulative air space 74 between each heated nozzle 10 and the surrounding cooled mold 12.

In the configuration shown, each heated nozzle 10 has an insert portion 76 which is secured in a seat 78 by a threaded nozzle seal 80 which is screwed into place to form the front end 36 of the heated nozzle 10. The insert portion 76 is made of several steel pieces 82 which fit together to form an outer annular melt channel 84 extending around an inner melt channel 86 which, in turn, extends around a central melt channel 88 to the front end 36. The central melt channel 88 extends from the rear end 14 of the heated nozzle 10, while a single melt bore 90 extends from the inner annular melt channel 84 to the rear end 14 of the heated nozzle 10. Four equally spaced melt bores 92 extend from the outer annular channel 84 to the rear end 14 of the heated nozzle 10. A circle of spaced holes 94 are drilled in the rear end 14 of the heated nozzle 10 around the single melt bore 90 to provide some thermal separation between it and the central channel 88 and the four spaced holes 92.

One melt passage 96 extends from an inlet 98 through a cylindrical manifold extension 100 and branches in the rear melt distribution manifold 20 before extending through the melt transfer and dividing bushing 22 aligned with each heated nozzle 10 according to the invention. The melt transfer and dividing bushings 22 are retained in proper alignment by small alignment dowels 102 extending into the front melt distribution manifolds 18. While only a single heated nozzle 10 is shown for ease of illustration, it is understood that in a typical configuration there will be many heated nozzles 10 (eg. 32, 48 or 64) seated in the mold to receive melt through the melt passage 96 which will have a more complex configuration than that shown. Another melt passage 104 extends from another inlet 106 and branches in the front melt distribution manifold 18 to extend through an L-shaped passage 108 drilled in each melt transfer and dividing bushing 22. As can be seen, the L-shaped passage 108 extends from an inlet 110 on the side surface 112 of the melt transfer and dividing bushing 22 to an outlet 114 at the front end 116 aligned with the melt bore 90 extending to the inner annular channel 86 in each heated nozzle 10.

Figure 2:
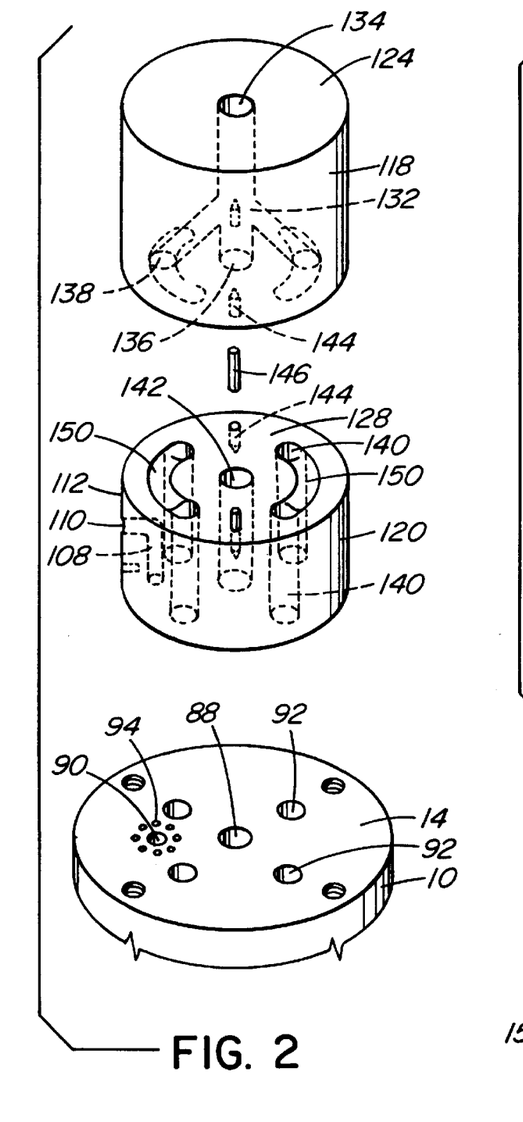
FIG. 2 is an exploded isometric view showing the two layers of the melt transfer and dividing bushing seen in FIG. 1 before they are integrally joined together.
Figure 3:
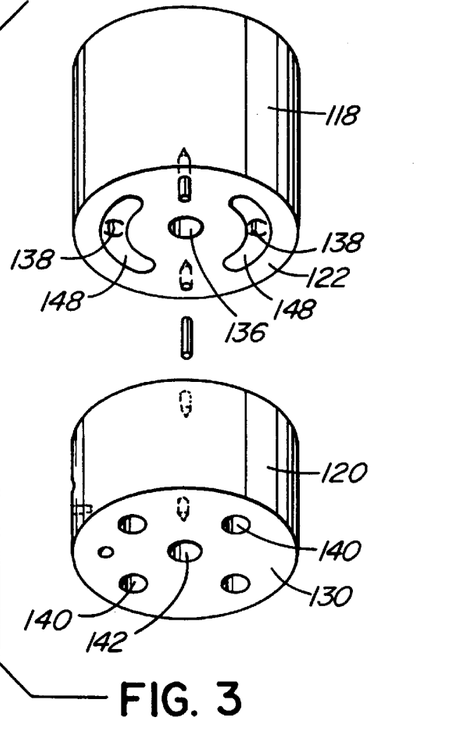
FIG. 3 is a similar view showing the other faces of the two layers of the same melt transfer and dividing bushing.
Figure 4:
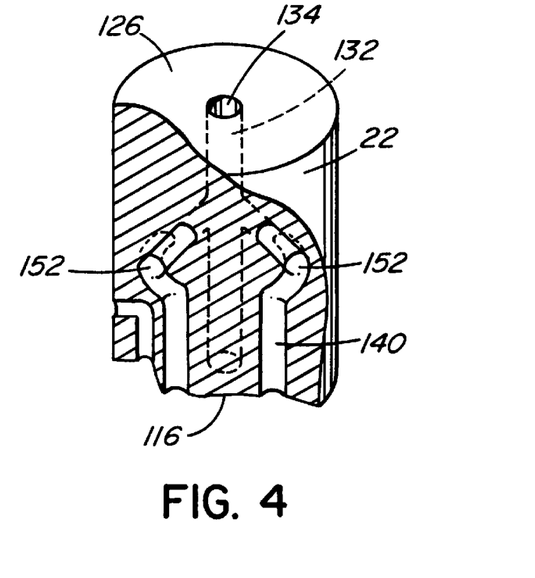
FIG. 4 is a cut-away isometric view showing the melt conduits in the same melt transfer and dividing bushing.
Figure 5:
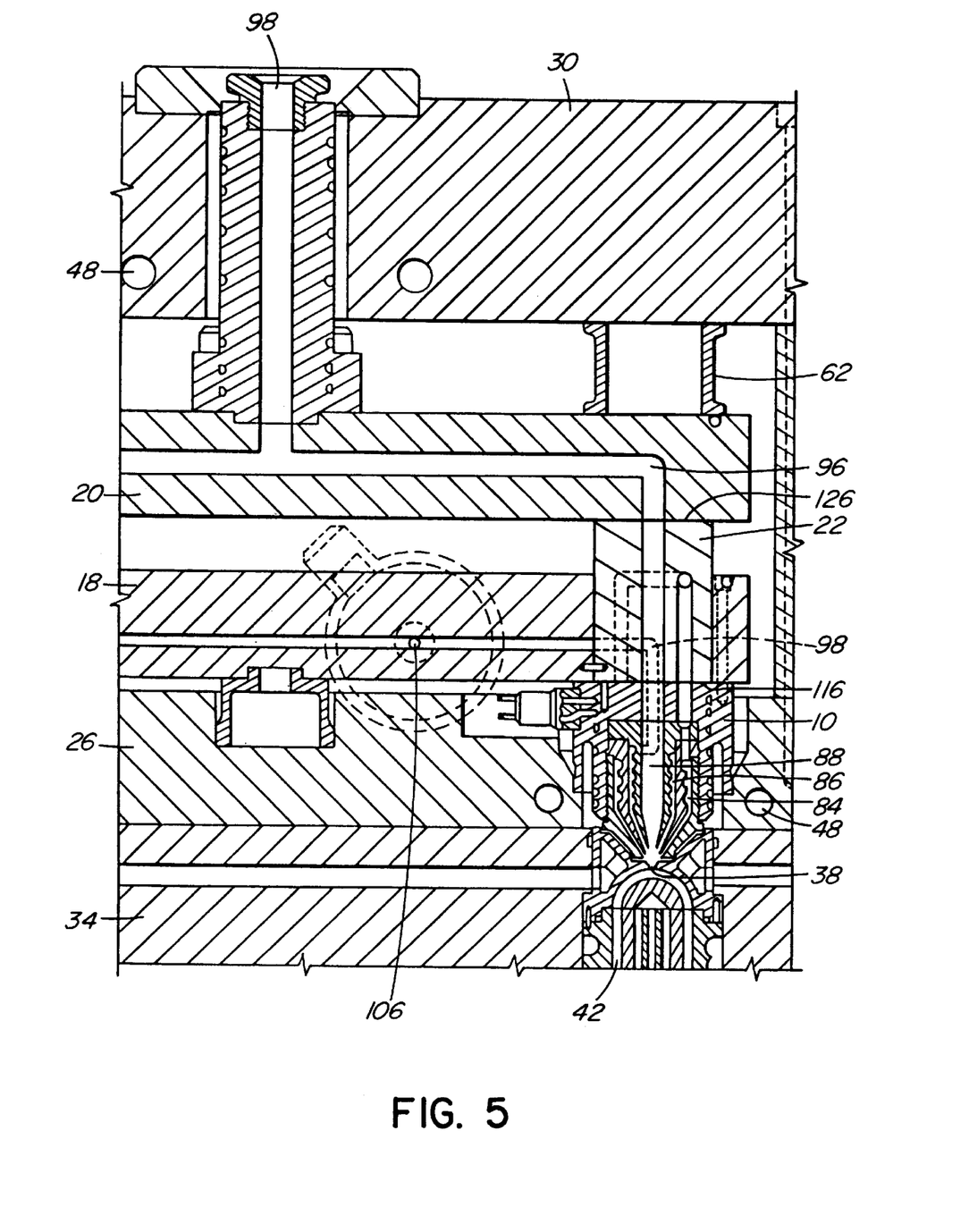
FIG. 5 is a sectional view of a portion of a multi-layer injection molding apparatus having integral three layer melt transfer and dividing bushings according to another embodiment of the invention.

Reference is now also made to FIGS. 2 to 4 to describe how each steel melt transfer and dividing bushing 22 is made by integrally joining together a rear layer 118 and a front layer 120. The rear layer 118 is made with a front face 122 and a rear face 124 which forms the rear end 126 of the melt transfer and dividing bushing 22. The front layer 120 is made with a rear face 128 and a front face 130 which forms the front end 116 of the melt transfer and dividing bushing 22. The rear layer 118 is drilled to have a portion 132 of the first melt passage 96 extending therethrough from a central common inlet 134 on its rear face 124. As can be seen, in this embodiment, this portion 132 of the first melt passage 96 extends partway through the rear layer 118 from a central inlet 134 and then splits into three and extends to a central outlet 136 and two other spaced outlets 138 on the front face 122 of the rear layer 118. The front layer 120 is drilled to have four holes 140 spaced around a central hole 142 extending therethrough from its rear face 128 to its front face 130. The front layer 120 is also drilled to have the L-shaped passage 108 extending therethrough, and the rear and front layers 118, 120 are drilled to have holes 144 to receive alignment dowels 146.

The front face 122 of the rear layer 118 and the rear face 128 of the front layer 120 are machined to have a pair of matching grooves 148, 150 which join when the two layers 118, 120 are joined together to form a pair of curved melt conduits 152. Each curved melt conduit 152 branches from one of the two spaced outlets 138 from the rear layer 118 to two of the four spaced holes 140 through the front layer 120. When the melt transfer and dividing bushing 22 is mounted in place, the dowel 102 extending into the front melt distribution manifold 18 ensures that each of the four spaced holes 140 through the front layer 120 are aligned with the four melt bores 92 extending from the rear end 14 of the heated nozzle 10 to the outer annular channel 84. The central hole 142 through the front layer 120 also aligns with the central outlet 136 from the portion 132 of the first melt passage 96 extending through the rear layer 126 and the central channel 88 through the aligned heated nozzle 10.

A quantity of nickel alloy (not shown) is applied to the front face 122 of the rear layer and the two layers 118, 120 are assembled together with the front face 122 of the rear layer 118 abutting against the rear face 128 of the front layer 120 and the dowels 146 keeping them in proper alignment. The assembled layers 118, 120 are then loaded into a vacuum furnace and gradually heated to a temperature of approximately 925° F. which is above the melting temperature of the nickel alloy. As the furnace is heated, it is evacuated to a relatively high vacuum to remove substantially all of the oxygen and then partially backfilled with an inert gas such as argon or nitrogen. When the melting point of the nickel alloy is reached, the nickel alloy melts and flows by capillary action between the rear layer 118 and the front layer 120 to integrally braze the two layers 118, 120 together to form an integral melt transfer and dividing bushing 22.

In use, the injection molding system or apparatus is assembled as shown in FIG. 1 and operates to form three layer preforms or other products as follows. First, electrical power is applied to the heated element 52 in the rear melt distribution manifold 20 and to the heating elements 50 in the heated nozzles 10 to heat them to an operating temperature of about 565° F. Electrical power is also applied to the heating element 50 in the front melt distribution manifold 18 to heat it to an operating temperature of about 400° F. Water is applied to the cooling conduits 48 to cool the mold 12 and the gate and cavity inserts 40, 44. Hot pressurized melt is then injected from separate injection cylinders (not shown) into the first and second melt passages 96, 104 through inlets 98, 106 according to a predetermined injection cycle. The melt injected to the first melt passage is preferably a polyethylene terephthalate (PET) type material. The melt injected into the second melt passage 104 is a barrier type material such as ethylene vinyl alcohol copolymer (EVOH) in this embodiment or nylon or other suitable materials in other embodiments.

The first melt passage 96 which branches in the rear melt distribution manifold 20 splits into three in the rear layer 118 of each melt transfer and dividing bushing 22 and then divides in the pair of melt conduits 152 between the rear and front layers 118, 120 of each melt transfer and dividing bushing 22 to extend through both the central channel 88 and the outer annular channel 84 in each heated nozzle 10 to the aligned gate 38. The second melt passage 104 which branches in the front melt distribution manifold 18 extends through the L-shaped passage 108 in each melt transfer and dividing bushing 22 and the aligned melt bore 90 and inner annular channel 86 in each heated nozzle 10 to the gate 38. During each injection cycle, the molding machine (not shown), first injects a quantity of PET into the cavities 36 into the cavities 42 through the first melt passage 96. Predetermined quantities of PET and a barrier material are then simultaneously coinjected through the first and second melt passages 96, 104 to provide a central layer of barrier material between two outer layers of PET in the cavities 42. When the cavities 42 are almost filled, the injection pressure of the barrier material is released which stops its flow, but the flow of PET continues until the cavities 42 are completely filled. When the cavities 42 are completely filled and packed, the injection pressure of the PET is then released and, after a short cooling period, the mold is opened for ejection. After ejection, the mold is closed and the injection cycle is repeated continuously every few seconds with a frequency depending upon the number and size of cavities 42 and the exact materials being molded.

Reference is now made to FIGS. 5–8 which show a portion of a multi-cavity injection molding apparatus also for coinjecting three layer preforms or other products according to another embodiment of the invention. As many of the elements are the same as those described above, not all of the common elements are described again and those that are described again have the same reference numerals, In this case, each heated nozzle 10 has an outer annular channel 84, an inner annular channel 86 and a central channel 88 which is the same as the previous embodiment, except that there are two spaced melt bores 154 extending from the rear end 14 of the heated nozzle 10 to the inner annular melt channel 86 to improve the distribution of melt around the inner annular melt channel 86. However, each melt transfer and dividing bushing 22 has three layers rather than two which changes the paths of the first melt passage 96 and the second melt passage 104.

Figure 6:
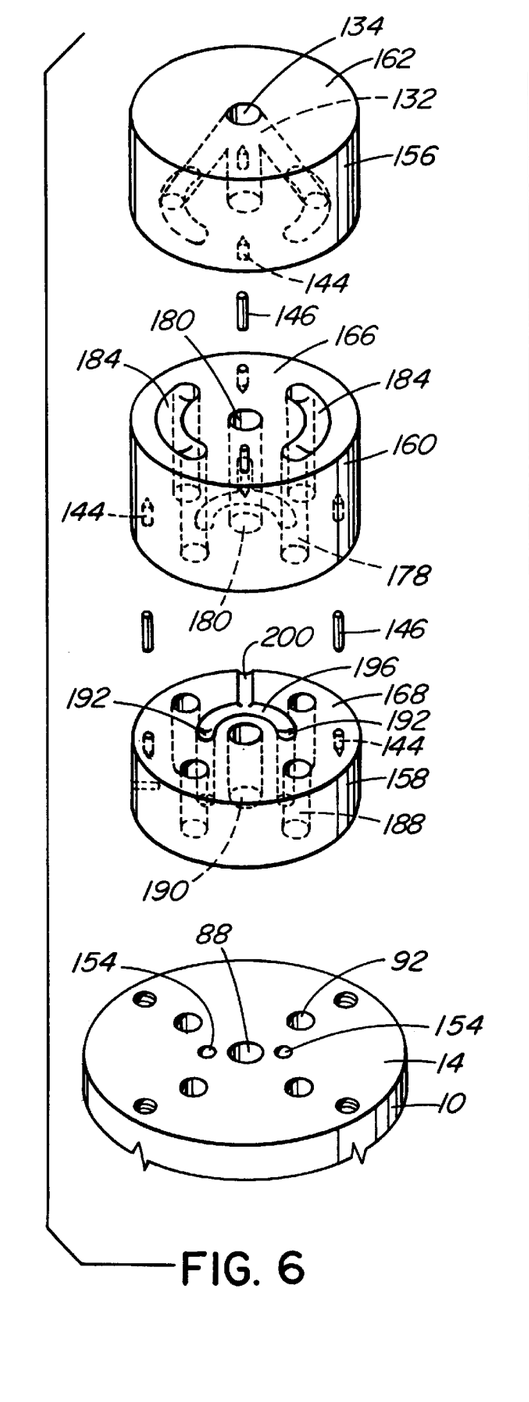
FIG. 6 is an exploded isometric view showing the three layers of the melt transfer and dividing bushing seen in FIG. 5 before they are integrally joined together.
Figure 7:
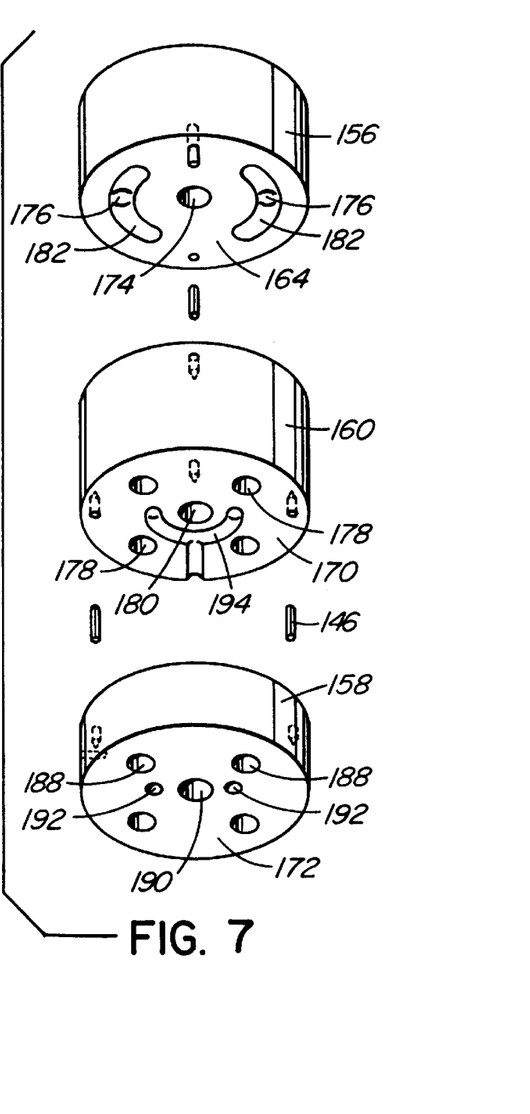
FIG. 7 is a similar view showing the other faces of the three layers of the same melt transfer and dividing bushing.
Figures 8, 12:
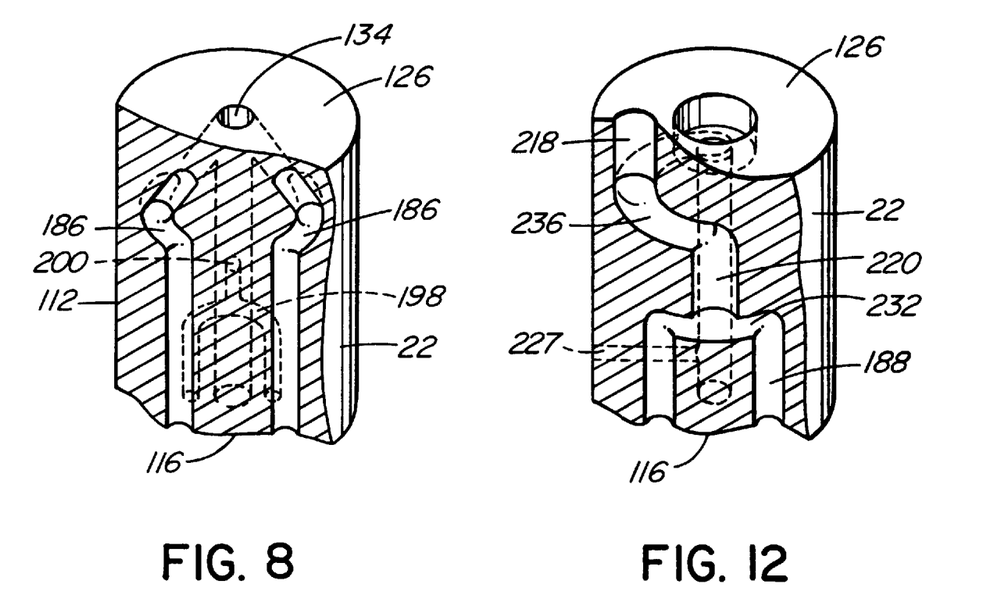
FIG. 8 is a cut-away isometric view showing the melt conduits in the same melt transfer and dividing bushing.
FIG. 12 is a cut-away isometric view showing the melt conduits in the same melt transfer and dividing bushing.

Referring also to FIGS. 6–8, each steel melt transfer and dividing bushing 22 is made by integrally joining together a first layer 156, a third layer 158 at its front end 116 and a second layer 160 between the first and third layers 156, 158. The first layer 156 is made with a rear face 162 which forms the rear end 126 of the melt transfer and dividing bushing 22 and a front face 164 which abuts against the rear face 166 of the second layer 160. The third layer 158 is made with a rear face 168 that abuts against the front face 170 of the second layer 160 and a front face 172 which forms the front end 116 of the melt transfer and dividing bushing 22. The first layer 156 is drilled to have the portion 132 of the first melt passage 96 extending therethrough from a central common inlet 134 on its rear face 162 split into three to extend to a central outlet 174 and two other spaced outlets 176 on its front face 164. The second layer 160 is drilled to have four holes 178 spaced around a central hole 180 extending therethrough from its rear face 166 to its front face in alignment with the central outlet 174 from the first layer 156. The front face 164 of the first layer 156 and the rear face 166 of the second layer 160 are machined to each have a pair of matching grooves 182, 184 which join when the three layers 156, 158, 160 are joined together to form a pair of first curved melt conduits 186. Each first curved melt conduit 186 branches from one of the two spaced outlets 176 from the first layer 156 to two of the four spaced holes 178 through the second layer 160.

The third layer 158 is also drilled to have four holes 188 spaced around a central hole 190. Each of the four holes 188 are in alignment to connect one of the four holes 178 through the second layer 160 and one of the four melt bores 92 extending from the rear end 14 of the heated nozzle 10 to the outer annular channel 84. The central hole 190 is in alignment to connect the central hole 180 through the second layer 160 to the central melt channel 88 in the heated nozzle 10. The third layer 158 of the melt transfer and dividing bushing 22 is also drilled to have two other holes 192 spaced around the central hole 190 extending in alignment with the two spaced bores 154 extending from the rear end 14 of the heated nozzle 10 to the inner annular melt channel 86. The front face 170 of the second layer 160 and the rear face 168 of the third layer 158 are machined to have matching grooves 194, 196 which join when the three layers 156, 158, 160 are joined together to form a second curved melt conduit 198 which branches from an inlet 200 on the side surface 112 of the melt transfer and dividing bushing 22 to the two other spaced holes 192 through the third layer 158. Of course, the three layers 156, 158, 160 are also drilled to have holes 144 to receive alignment dowels 146. The melt transfer and dividing bushings 22 according to this embodiment of the invention are made the same as described above. The use or operation of the apparatus according to this embodiment of the invention is the same as described above, except that the melt injected into the second melt passage 104 branches in each second curved melt conduit 198 between the second and third layers 158, 160 and flows to the two other spaced holes 192 in the rear end 14 of each heated nozzle 10 rather than to only one.

Reference is now made to FIGS. 9–12 which show a portion of another multi-cavity injection molding apparatus for coinjecting three layer preforms or other products according to a further embodiment of the invention. In this case, each heated nozzle 10 only has one annular melt channel 202 extending around the central melt channel 88, with four spaced melt bores 204 extending from the rear end 14 of the aligned heated nozzle 10 to the annular melt channel 202. A circle of spaced small holes 205 are drilled in the rear end 14 of each heated nozzle 10 around the central melt channel 88 to provide some thermal separation between it and the adjacent spaced melt bores 204. An elongated fixed pin 206 having an enlarged head 208 seated in each melt transfer and dividing bushing 22 and a tapered front end 210 extending in alignment with each gate 38 provides hot tip gating. The first melt passage 96 extends through the annular melt channel 202 in each heated nozzle 10, while the second melt passage 104 extends through the central melt channel 88 along a groove 212 in the fixed pin 206.

Figure 10:
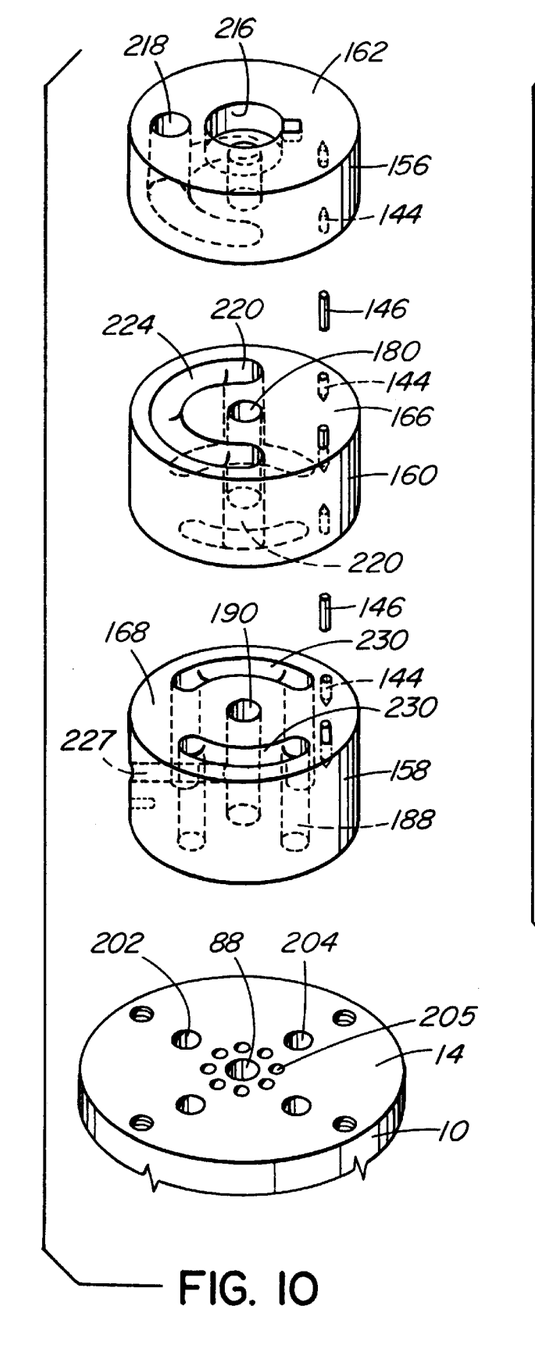
FIG. 10 is an exploded isometric view showing the three layers of the melt transfer and dividing bushing seen in FIG. 9 before they are integrally joined together.
Figure 11:
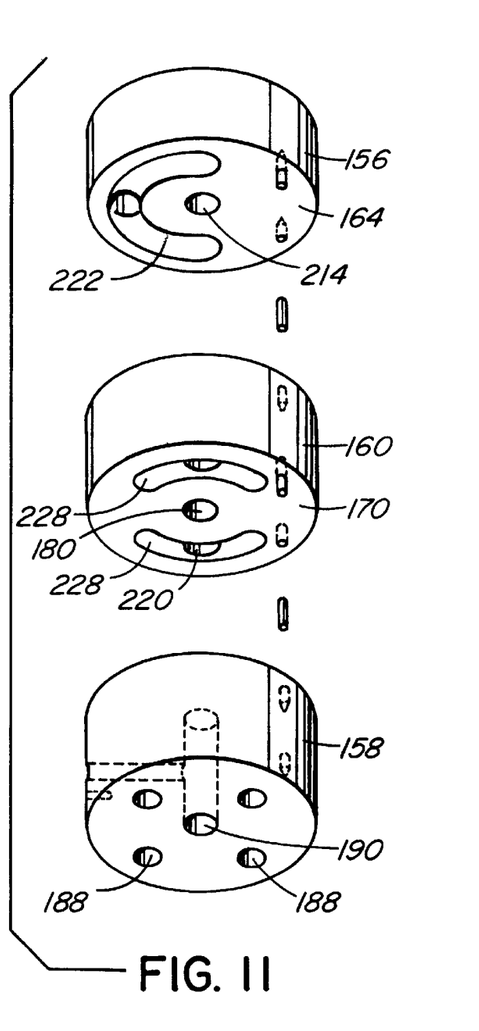
FIG. 11 is a similar view showing the other faces of the three layers of the same melt transfer and dividing bushing.

Referring also to FIGS. 10–12, each of these melt transfer and dividing bushings 22 is made by integrally joining together first, second and third layers 156, 160, 158. In this case, the first layer 156 is machined to have a central hole 214 extending therethrough from its rear face 162 to its front face 164. The central hole 214 has a larger diameter portion 216 adjacent the rear face 162 to receive the head 208 of the fixed pin 206. The first layer 156 is drilled to also have an off-center hole 218 extending therethrough. The second layer 160 is drilled to have two holes 220 spaced on opposite sides of a central hole 180 extending therethrough. The front face 164 of the first layer 156 and the rear face 166 of the second layer 160 are machined to have matching grooves 222, 224 which join when the three layers 156, 158, 160 are joined together to form a first curved melt conduit 226 which branches from the off-center hole 218 through the first layer 156 to the two spaced holes 220 through the second layer 160.

The third layer 158 is drilled to have four holes 188 spaced around a central hole 190 which is aligned with the central melt channel 88 in the aligned heated nozzle 10. Each of the four spaced holes 188 are in alignment with one of the four melt bores 204 extending from the rear end 14 of the heated nozzle 10 to the annular melt channel 202. The third layer 158 is drilled to also have a radial bore 227 extending to the central hole 190 in alignment with the second melt passage 104 in the front melt distribution manifold 18. The front face 170 of the second layer 160 and the rear face 168 of the third layer 158 are machined to each have a pair of matching grooves 228, 230 which join when the three layers 156, 158, 160 are joined together to form a pair of second curved melt conduits 232. Each second curved melt conduit 232 branches from one of the two spaced holes 220 through the second layer 160 to two of the four spaced holes 188 through the third layer 158 in alignment with the four melt bores 204 extending from the rear end 14 of the heated nozzle 10 to the annular melt channel 84. The three layers 156, 158, 160 are also drilled to have holes 144 to receive alignment dowels 146. The integral melt transfer and dividing bushings 22 according to this embodiment of the invention are made by the same process described above.

Figure 9:
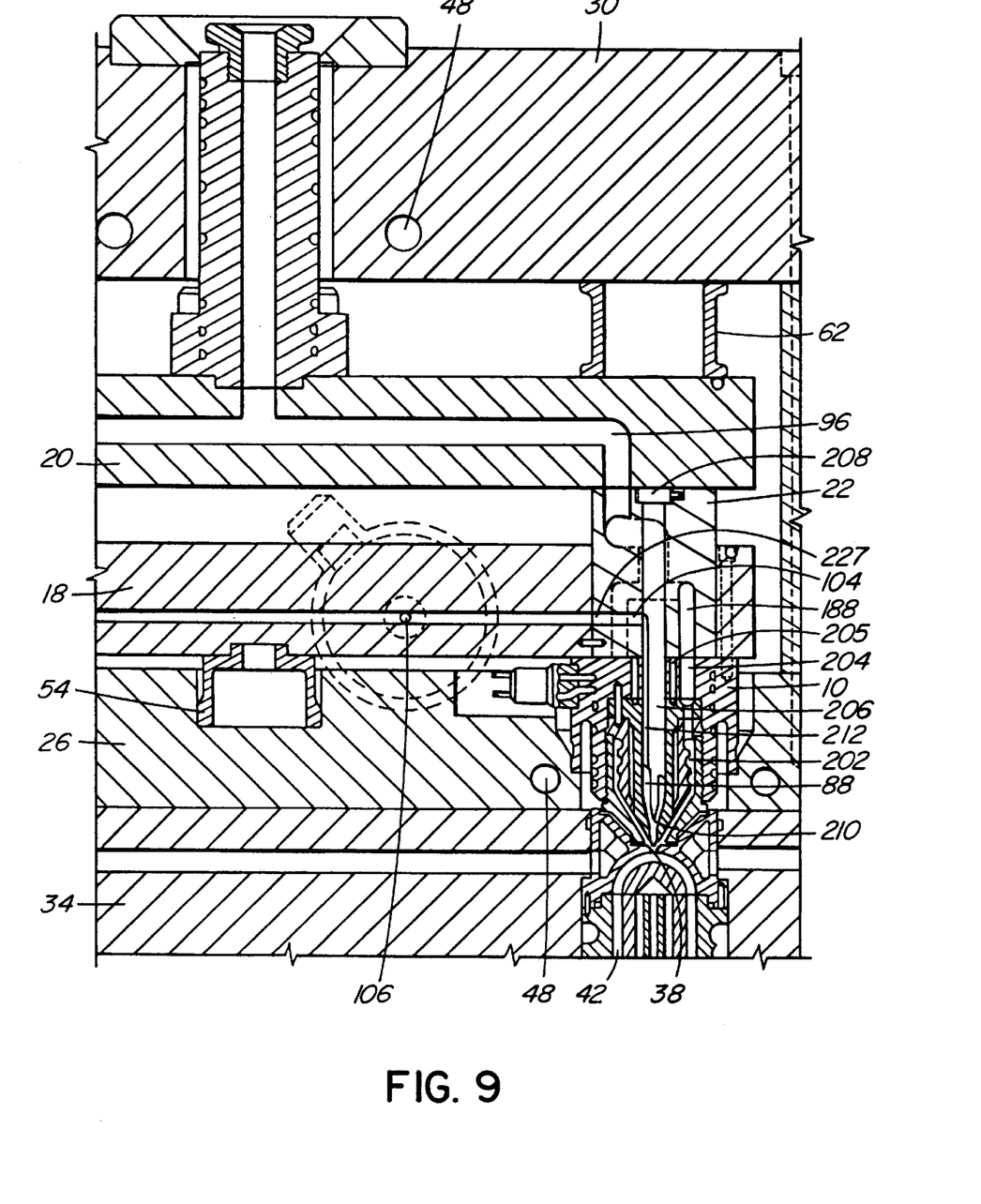
FIG. 9 is a sectional view of a portion of a multi-layer injection molding apparatus having a fixed pin extending through each melt transfer and dividing bushing according to a further embodiment of the invention.

In use, the injection molding system or apparatus is assembled as shown in FIG. 9 and heated and cooled as described above. The first melt passage 96 branches in the first melt conduit 226 between the first and second layers 156, 160 and the second melt conduit 232 between the second and third layers 160, 158 to extend through the four melt bores 204 to the annular melt channel 202 in each heated nozzle 10. The second melt passage 104 extends through the radial melt bore 227 and the groove 212 in the fixed pin 206 to the gate 38.

During each injection cycle, a predetermined quantity of PET is injected through the first melt passage 96 and outer layers of it adhere to the sides of the cavity 42. After a short period of time, a predetermined quantity of the less viscous barrier material is then simultaneously injected through the second melt passage 104 which forms a central layer between the two outer layers of PET. When the cavities 42 are almost filled, the injection pressure of the barrier material is released which stops its flow, but the flow of PET continues until the cavities 42 are completely filled. Injection pressure of the PET is then released and, after a short cooling period, the mold 12 is opened for ejection. After ejection, the mold 12 is closed and the injection cycle is repeated continuously every few seconds with a frequency depending upon the number and size of the cavities 42 and the exact material being molded.

Reference is now made to FIGS. 13–16 which show an injection molding apparatus according to a further embodiment of the invention for molding five layer preforms or other products using valve gating. In this case, each heated nozzle 10 again has outer and inner annular melt channels 84, 86 extending around a central melt channel 88. An elongated valve pin 234 is reciprocated in the central melt channel 88 in each heated nozzle 10 by hydraulic actuating mechanism 236 seated in the back or cylinder plate 30 according to a predetermined cycle. The first layer 156 of each melt transfer and dividing bushing 22 has a cylindrical neck portion 238 which extends rearwardly into an opening 240 in the rear melt distribution manifold 20. The neck portion 238 has several circumferential grooves 242 extending around the central hole 244 to catch any melt leaking around the reciprocating valve pin 234. The first layer 156 also has an off-center hole 218 extending therethrough and a central hole 244 which extends from its front face 164 through the neck portion 238.

In this embodiment, a first melt conduit 246 formed by matching grooves 248, 250 machined in the front face 164 of the first layer 156 and the rear face 168 of the second layer 160 extends from the off-center hole 218 to the central hole 180 through the second layer 160 as well as to the two spaced holes 220 through the second layer 160. A pair of second melt conduits 232 formed by matching grooves 228, 230 machined in the front face 170 of the second layer 160 and the rear face 168 of the third layer 158 branch from the two spaced holes 220 in the second layer 160 to the four spaced holes 188 through the third layer 158. Thus, the first melt passage 96 extends through the aligned central holes 180, 190 through the second and third layers 160, 158 and the central melt channel 88 in the aligned heated nozzle 10 as well as through the two spaced holes 220 through the second layer 160, the second curved melt conduits 232 and the four holes 188 through the third layer 158 and the four melt bores 92 extending to the outer annular channel 84. The third layer 158 also has an L-shaped passage 252 through which the second melt passage 104 extends from the front melt distribution manifold 18 to the melt bore 90 extending from the rear end 14 to the inner annular melt channel 86 in the aligned heated nozzle 10.

Figure 13:
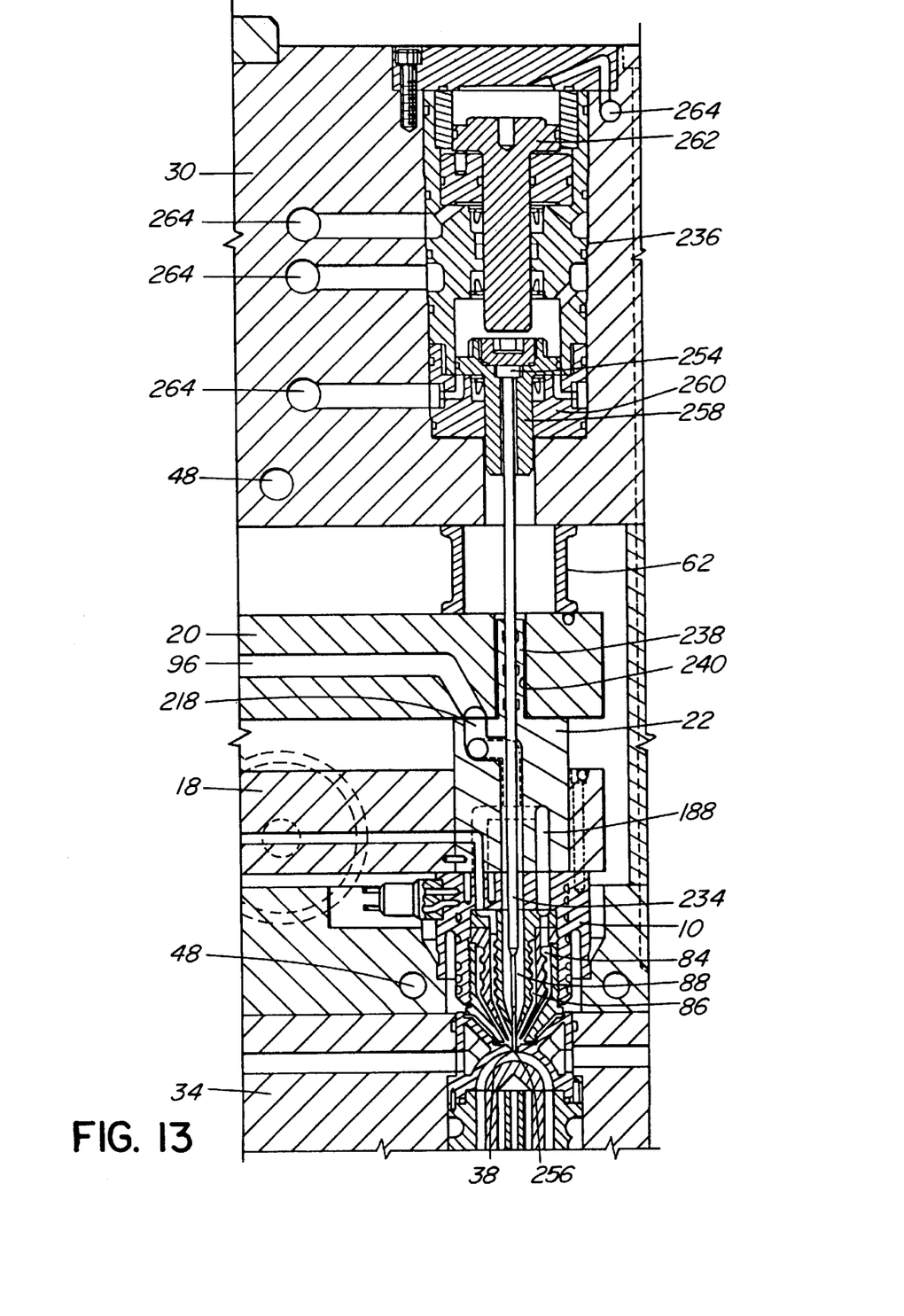
FIG. 13 is a sectional view of a portion of multi-layer injection molding apparatus having a valve pin extending through each melt transfer and dividing bushing according to another embodiment of the invention.
Figure 14:
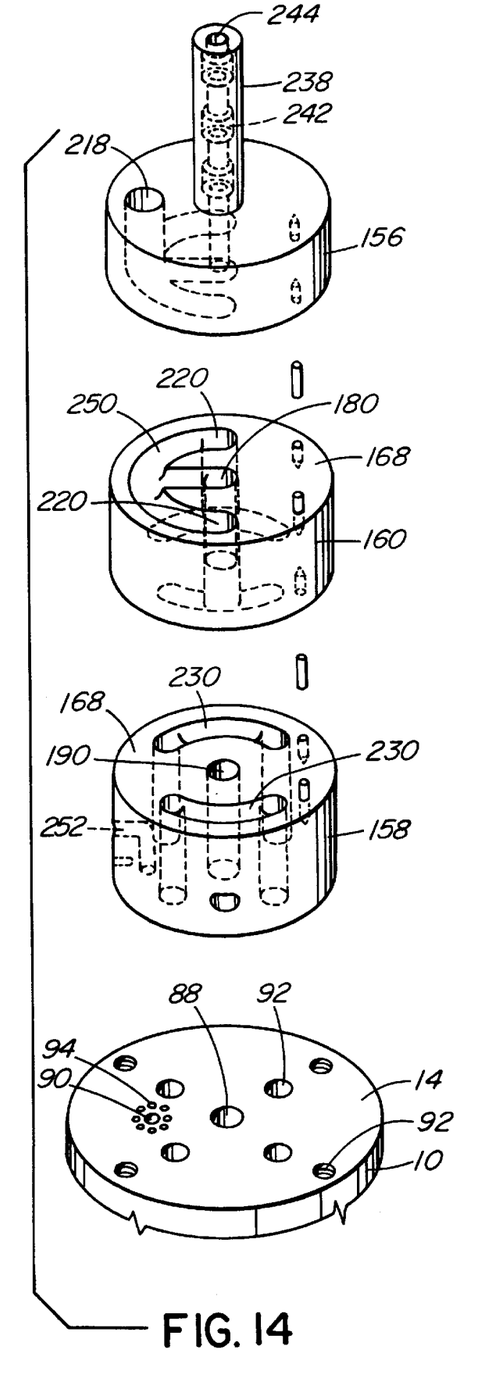
FIG. 14 is an exploded isometric view showing the three layers of the melt transfer and dividing bushing seen in FIG. 13 before they are integrally joined together.
Figure 15:
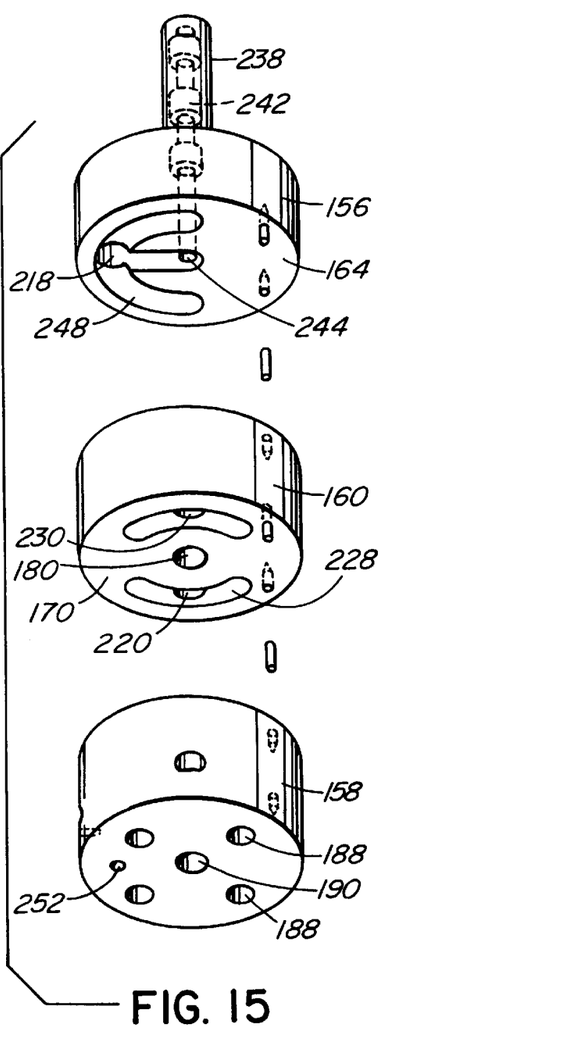
FIG. 15 is a similar view showing the other faces of the three layers of the melt transfer and dividing bushing.
Figure 16:
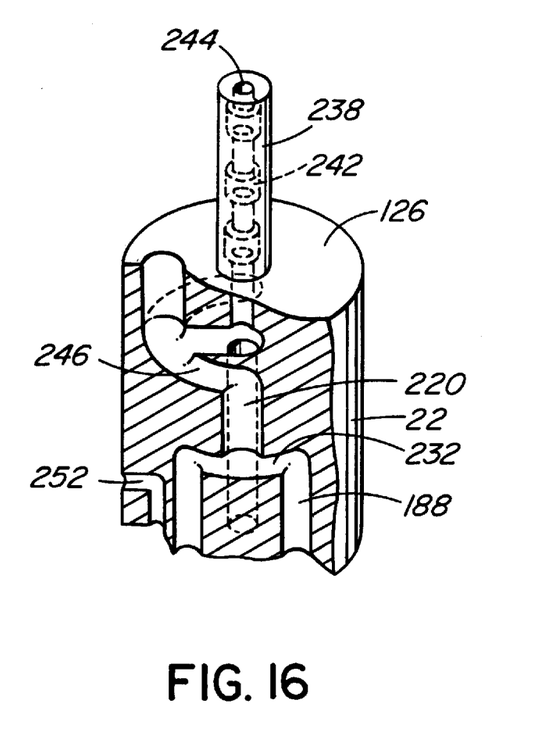
FIG. 16 is a cut-away isometric view showing the melt conduits in the same melt transfer and dividing bushing.

The elongated valve pin 234 has a rear head 254 and a cylindrical front tip 256 which fits in the aligned gate 38. The rear head 254 is connected to a front piston 258 seated in a cylinder 260 in the back or cylinder plate 30. The actuating mechanism 236 also includes a rear piston 262 and the two pistons 258, 262 are driven by controlled hydraulic pressure applied to ducts 264 to reciprocate the valve pin 234 between four different positions. While hydraulic actuating mechanisms 236 are shown for ease of illustration, of course other types of actuating mechanisms such as electromechanical mechanisms can be used for other applications.

In the first position, the front tip 256 of each valve pin 234 is retracted only far enough to allow a small quantity of PET to flow through the outer annular melt channel 84. Then the front tip 256 of each valve pin 234 is retracted further to a second position to also allow the barrier material to flow through the inner annular melt channel 86. The barrier material flowing simultaneously with the PET, divides the PET into two outer layers. After a short time, the front tip 256 of each valve pin 234 is retracted to the third position to allow PET to flow through the central melt channel 88 around the valve pin 234. This flow of PET through the central melt channel 88 splits the flow of barrier material in two and provides a central PET layer between two layers of barrier material.

When the cavities 42 are almost filled, the front tip 256 of each valve pin 234 is returned to the first position closing off the flow of PET through the central melt channel 88 and the flow of the barrier material through the inner annular melt channel 86. The flow of PET through the outer annular melt channel 84 continues until the cavities 42 are completely filled and the valve pin 234 is then driven to the forward closed position shown in FIG. 13 in which its front tip 256 is received in the gate 38. After a short cooling period, the mold is opened for ejection. After ejection, the mold is closed and the cycle is repeated continuously every 15 to 30 seconds with a frequency depending upon the wall thickness and number and size of cavities 36 and the exact materials being molded.

While the description of the multi-layer injection molding apparatus having integral multi-layer melt transfer and dividing bushings has been given with respect to preferred embodiments, it will be evident that various modifications are possible without departing from the scope of the invention as understood by those skilled in the art and as defined in the following claims. For instance, heated nozzles 10 and melt transfer and dividing bushings 22 having different combinations of melt channels and layers can be used for different applications. Also, other materials having suitable characteristics can be used rather than PET, EVOH and nylon. Of course, different materials will require different operating temperatures and may require different sized melt passages.

The embodiments of the invention in which an exclusive property or privilege is claimed is defined as follows:

1. In a multi-cavity hot runner injection molding apparatus for multi-layer molding having a front melt distribution manifold and a rear melt distribution manifold mounted in a mold extending substantially parallel to each other with an insulative air space therebetween, a plurality of heated nozzles, each heated nozzle having a rear end, a front end, a central melt channel extending therethrough from the rear end to the front end and an annular melt channel extending around the central melt channel to the front end with a plurality of spaced melt bores extending from the rear end of the heated nozzle to the annular melt channel, the heated nozzles being mounted in the mold with the rear end of each heated nozzle abutting against the front melt distribution manifold, the improvement wherein;

a first melt passage from a first melt source branches in the rear melt distribution manifold and extends through the plurality of melt bores and the annular melt channel in each heated nozzle to a gate adjacent the front end of the heated nozzle leading to a cavity in the mold, and a second melt passage from a second melt source branches in the front melt distribution manifold and extends through the central melt channel in each heated nozzle to the gate, a plurality of melt transfer and dividing bushings each having a rear end and a front end and being mounted in an opening through the front melt distribution manifold, with the front end of the melt transfer and dividing bushings abutting against the rear end of one of the heated nozzles, each melt transfer and dividing bushing having a portion of the first melt passage extending therethrough from a common inlet and dividing therein to a plurality of spaced holes at the front end thereof, the common inlet being in alignment with the first melt passage in the rear melt distribution manifold and each hole at the front end thereof being in alignment with one of the melt bores extending from the rear end of the heated nozzle to the annular melt channel.

2. Injection molding apparatus as claimed in claim 1 wherein the rear end of each melt transfer and dividing bushing abuts against the rear melt distribution manifold and the common inlet is at the rear end of the melt transfer and dividing bushing.

3. Injection molding apparatus as claimed in claim 2 wherein there are four spaced holes at the front end of each melt transfer and dividing bushing and four aligned melt bores extending from the rear end of the heated nozzle to the annular melt channel.

4. Injection molding apparatus as claimed in claim 3 wherein each melt transfer and dividing bushing also has a portion of the second melt passage extending therethrough from an inlet on the side surface thereof to an outlet at the front end thereof, the inlet being in alignment with the second melt passage in the front melt distribution manifold and the outlet being in alignment with the central melt channel extending through the heated nozzle.

5. Injection molding apparatus as claimed in claim 4 wherein each melt transfer and dividing bushing comprises a rear layer and a front layer integrally joined together, the rear layer having a front face and a rear face abutting against the rear melt distribution manifold, the front layer having a rear face, a front face and four spaced holes extending therethrough from the rear face to the front face, the rear face of the front layer abutting against the front face of the rear layer, the first melt passage splitting in the rear layer from the connon inlet on the rear face thereof to two spaced outlets on the front face thereof, and the front face of the rear layer and the rear face of the front layer having matching grooves which form a pair of melt conduits, each of said melt conduits branching from one of the spaced outlets on the front face of the rear layer to two of the four spaced holes extending through the front layer, whereby the first melt passage front the first melt source splits in the rear layer and extends through the pair of melt conduits and the four spaced holes through the front layer to the four spaced melt bores and the annular melt channel through each heated nozzle.

6. Injection molding apparatus as claimed in claim 3 wherein each melt transfer and dividing bushing has a first layer at the rear end, a third layer at the front end, and a second layer between the first and third layers, the first, second and third layers being integrally joined together to form a melt transfer and dividing bushing, the first layer having a rear face abutting against the rear melt distribution manifold, a front face, a central hole extending therethrough and an off-center hole extending therethrough from the common inlet on the rear face to the front face, the third layer having a rear face, a front face, a central hole extending therethrough from the rear face to the front face and four holes extending therethrough spaced around the central hole, the front face of the third layer abutting against the rear end of the heated nozzle with the four spaced holes through the third layer aligned with the four spaced melt bores at the rear end of the heated nozzle, a second layer having a rear face, a front face, a central hole extending therethrough from the rear face to the front face in alignment with the central holes through the first and third layers, and two holes spaced around the central hole extending therethrough from the rear face to the front face, the rear face of the second layer abutting against the front face of the first layer, the front face of the first layer and the rear face of the second layer having matching grooves therein which form a first melt conduit which branches from the off-center hole through the first layer to the two spaced holes through the second layer, the front face of the second layer abutting against the rear face of the third layer, the front face of the second layer and the rear face of the third layer having matching grooves therein which form a pair of second melt conduits, each of said second melt conduits branching from one of the two spaced holes through the second layer to two of the four spaced holes extending through the third layer, the first melt passage from the first melt source extending through the off-center hole through the first layer, the first melt conduit, the two spaced holes through the second layer, the pair of second melt conduits, and the four spaced holes through the third layer of each melt transfer and dividing bushing to the four spaced melt bores and the annular melt channel through each heated nozzle, whereby the aligned central holes through the first, second and third layers of each melt transfer and dividing bushing receives an elongated pin which extends forwardly therefrom into the central melt channel in the aligned heated nozzle with the second melt passage from the second melt source extending along the elongated pin.

7. Injection molding apparatus as claimed in claim 6 wherein the elongated pin is a valve pin and further including actuating mechanism to reciprocate the valve member between a retracted open position and a forward closed position.

8. Injection molding apparatus as claimed in claim 7 wherein the first layer of each melt transfer and dividing bushing has a neck portion extending rearwardly into an opening in the rear melt distribution manifold and the elongated valve pin fits in the central hole in the first layer tightly enough to prevent melt leakage as the elongated valve pin reciprocates.

9. Injection molding apparatus as claimed in claim 6 wherein the elongated pin is a fixed pin with a longitudinally extending melt groove therein.

10. In a multi-cavity hot runner injection molding apparatus for multi-layer molding having a front melt distribution manifold and a rear melt distribution manifold mounted in a mold extending substantially parallel to each other with an insulative air space therebetween, a plurality of heated nozzles, each heated nozzle having a rear end, a front end, a central melt channel extending therethrough from the rear end to the front end and an inner annular melt channel extending around the central melt channel to the front end with at least one melt bore extending from the rear end of the heated nozzle to the inner annular melt channel, the heated nozzles being mounted in the mold with the rear end of each heated nozzle abutting against the front melt distribution manifold, the improvement wherein;

each heated nozzle also has an outer annular melt channel extending to the front end around the inner annular melt channel and four spaced melt bores extending from the outer annular melt channel to the rear end of the heated nozzle, a first melt passage from a first melt source branches in the rear melt distribution manifold and extends through the central melt channel and the four spaced melt bores and the outer annular melt channel in each heated nozzle to a gate adjacent the front end of the heated nozzle leading to a cavity in the mold, and a second melt passage from a second melt source branches in the front melt distribution manifold and extends through the at least one melt bore and the inner annular channel in each heated nozzle to the gate, a plurality of melt transfer and dividing bushings each having a rear end and a front end and are mounted in an opening through the front melt distribution manifold, with the front end of the melt transfer and dividing bushings abutting against the rear end of one of the heated nozzles, each melt transfer and dividing bushing has a portion of the first melt passage extending therethrough from a common inlet and dividing therein to a central hole and four spaced holes at the front end thereof, the common inlet is in alignment with the first melt passage in the rear melt distribution manifold, the central hole is in alignment with the central melt channel and the four spaced holes are in alignment with the four melt bores extending from the rear end of the heated nozzle to the outer annular melt channel.

11. Injection molding apparatus as claimed in claim 10 wherein each melt transfer and dividing bushing also has a portion of the second melt passage extending therethrough from an inlet on the side surface thereof to at least one outlet at the front end thereof, the inlet being in alignment with the second melt passage in the front melt distribution manifold and the at least one outlet being in alignment with the at least one melt bore extending from the rear end of the heated nozzle to the inner annular melt channel extending through the heated nozzle.

12. Injection molding apparatus as claimed in claim 10 wherein the rear end of each melt transfer and dividing bushing abuts against the rear melt distribution manifold and the common inlet is at the rear end of the melt transfer and dividing bushing.

13. Injection molding apparatus as claimed in claim 12 wherein each melt transfer and dividing bushing comprises a rear layer and a front layer integrally joined together, the rear layer having a rear face abutting against the rear melt distribution manifold, a front face, the first melt passage splitting in the rear layer from the common inlet on the rear face thereof to a central outlet and two other spaced outlets on the front face thereof, the front layer having a rear face, a front face, a central hole and four holes spaced around the central hole extending therethrough from the rear face to the front face, the rear face of the front layer abutting against the front face of the rear layer, and the front face of the rear layer and the rear face of the front layer having matching grooves which form a pair of melt conduits, each of said melt conduits branching from one of the other spaced outlets from the first melt conduit to two of the four spaced holes extending through the front layer, whereby the first melt passage extends from the common inlet through the first melt conduit through the rear layer, the central hole through the front layer to the central outlet and through the two melt conduits and the four spaced holes through the front layer in alignment with the four melt bores extending from the outer annular melt channel to the rear end of the heated nozzle.

14. Injection molding apparatus as claimed in claim 13 wherein the first melt passage extending through the rear layer splits into three at the common inlet on the rear face of the rear layer and extends to the central outlet and the other two spaced outlets on the front face of the rear layer.

15. Injection molding apparatus as claimed in claim 13 wherein the first melt passage extending through the rear layer extends from the common inlet on the rear face of the rear layer partway through the rear layer and then splits into three and extends to the central outlet and the other two spaced outlets on the front face of the rear layer.

16. Injection molding apparatus as claimed in claim 10 wherein each heated nozzle has two spaced melt bores extending from the rear end to the inner annular melt channel and each melt transfer and dividing bushing has a first layer at the rear end, a third layer at the front end, and a second layer between the first and third layers, the first, second and third layers being integrally joined together to form a melt transfer and dividing bushing, the first layer having a front face and a rear face abutting against the rear melt distribution manifold, the third layer having a rear face, a front face, a central hole extending therethrough from the rear face to the front face, four holes spaced around the central hole extending therethrough to the four outlets on the front end and two other holes spaced around the central hole extending therethrough in alignment with the two spaced melt bores extending from the rear end of the heated nozzle, the front face of the third layer abutting against the rear end of the heated nozzle with the four spaced outlets from the third layer aligned with the four spaced melt bores at the rear end of the heated nozzle, a second layer having a rear face, a front face, a central hole extending therethrough from the rear face to the front face in alignment with the central hole through the third layer and four holes spaced around the central hole extending therethrough in alignment with the four spaced holes through the third layer, the rear face of the second layer abutting against the front face of the first layer, the front face of the second layer abutting against the rear face of the third layer, the first melt passage splitting in the first layer from the common inlet on the rear face thereof to a central outlet and two other spaced outlets on the front face thereof, the central outlet aligned with the central hole through the second layer, the front face of the first layer and the rear face of the second layer having matching grooves therein which form a pair of first melt conduits, each of said first melt conduits branching from one of the spaced outlets on the front face of the first layer to two of the four spaced holes through the second layer, and the front face of the second layer and the rear face of the third layer having matching grooves therein which form a second melt conduit which branches from an inlet aligned with the second melt passage in the front melt distribution manifold to the two other spaced holes extending through the third layer, each of said second melt conduits branching from one of the two spaced holes through the second layer to two of the four spaced holes extending through the third layer, whereby the first melt passage from the first melt source splits in the first layer and extends through the aligned central holes through the second and third layers to the aligned central melt channel extending through each heated nozzle, and through the pair of first melt conduits, and the aligned four spaced holes through the second and third layers of each melt transfer and dividing bushing to the four spaced melt bores and the outer annular melt channel through each heated nozzle and the second melt passage from the second melt source extends through the second melt conduit and the two other spaced holes through the third layer to the two spaced melt bores and the inner annular melt channel through each heated nozzle.

17. Injection molding apparatus as claimed in claim 11 wherein each melt transfer and dividing bushing has a first layer at the rear end, a third layer at the front end, and a second layer between the first and third layers, the first, second and third layers being integrally joined together to form a melt transfer and dividing bushing, the first layer having a rear face abutting against the rear melt distribution manifold, a front face and an off-center hole extending therethrough from the common inlet on the rear face to the front face, the third layer having a rear face, a front face, a central hole extending therethrough from the rear face to the front face and four holes extending therethrough spaced around the central hole, the front face of the third layer abutting against the rear end of the heated nozzle with the four spaced holes through the third layer aligned with the four spaced melt bores at the rear end of the heated nozzle, a second layer having a rear face, a front face, a central hole extending therethrough from the rear face to the front face in alignment with the central hole through the third layer, and two holes spaced around the central hole extending therethrough from the rear face to the front face, the rear face of the second layer abutting against the front face of the first layer, the front face of the first layer and the rear face of the second layer having matching grooves therein which form a first melt conduit which branches from the off-center hole through the first layer to the central hole and the two spaced holes through the second layer, the front face of the second layer abutting against the rear face of the third layer, the front face of the second layer and the rear face of the third layer having matching grooves therein which form a pair of second melt conduits, each of said second melt conduits branching from one of the two spaced holes through the second layer to two of the four spaced holes extending through the third layer, the first melt passage from the first melt source extending through the off-center hole through the first layer, the first melt conduit, the aligned central holes through the second and third layers to the aligned central melt channel extending through each heated nozzle, and through the two spaced holes through the second layer, the pair of second melt conduits, and the four spaced holes through the third layer of each melt transfer and dividing bushing to the four spaced melt bores and the outer annular melt channel through each heated nozzle.

18. Injection molding apparatus as claimed in claim 17 wherein the first layer also has a neck portion extending rearwardly into an opening through the rear melt distribution manifold with a central hole extending therethrough from the front face of the first layer, and further comprising an elongated valve pin extending through the aligned central holes in the first, second and third layers of each melt transfer and dividing bushing, and the aligned central melt channel in the adjacent heated nozzle with the first melt passage extending along the elongated valve pin, and actuating mechanism to reciprocate the elongated valve pin between a retracted open position and a forward closed position.

* * * * *